W. KAISLING.
COMBINATION LIGHTING AND IGNITION SWITCH.
APPLICATION FILED DEC. 17, 1921.
Reissued Feb. 21, 1922.
15,289.
2 SHEETS—SHEET 1.
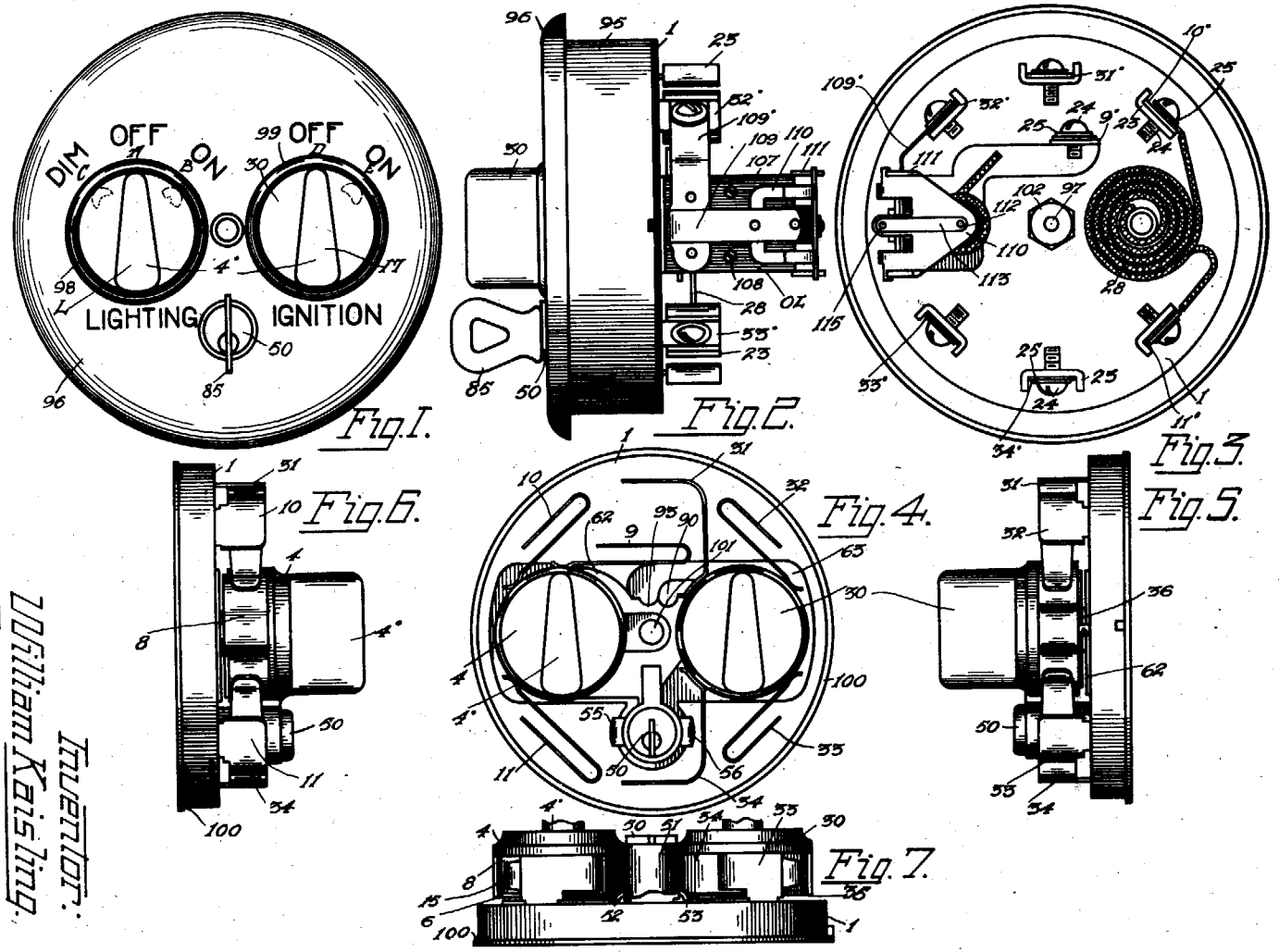
Inventor:
William Kaisling.
By Curtis B. Camp.
Attorney.

W. KAISLING.
COMBINATION LIGHTING AND IGNITION SWITCH.
APPLICATION FILED DEC. 17, 1921.
Reissued Feb. 21, 1922. 15,289.
2 SHEETS—SHEET 2.
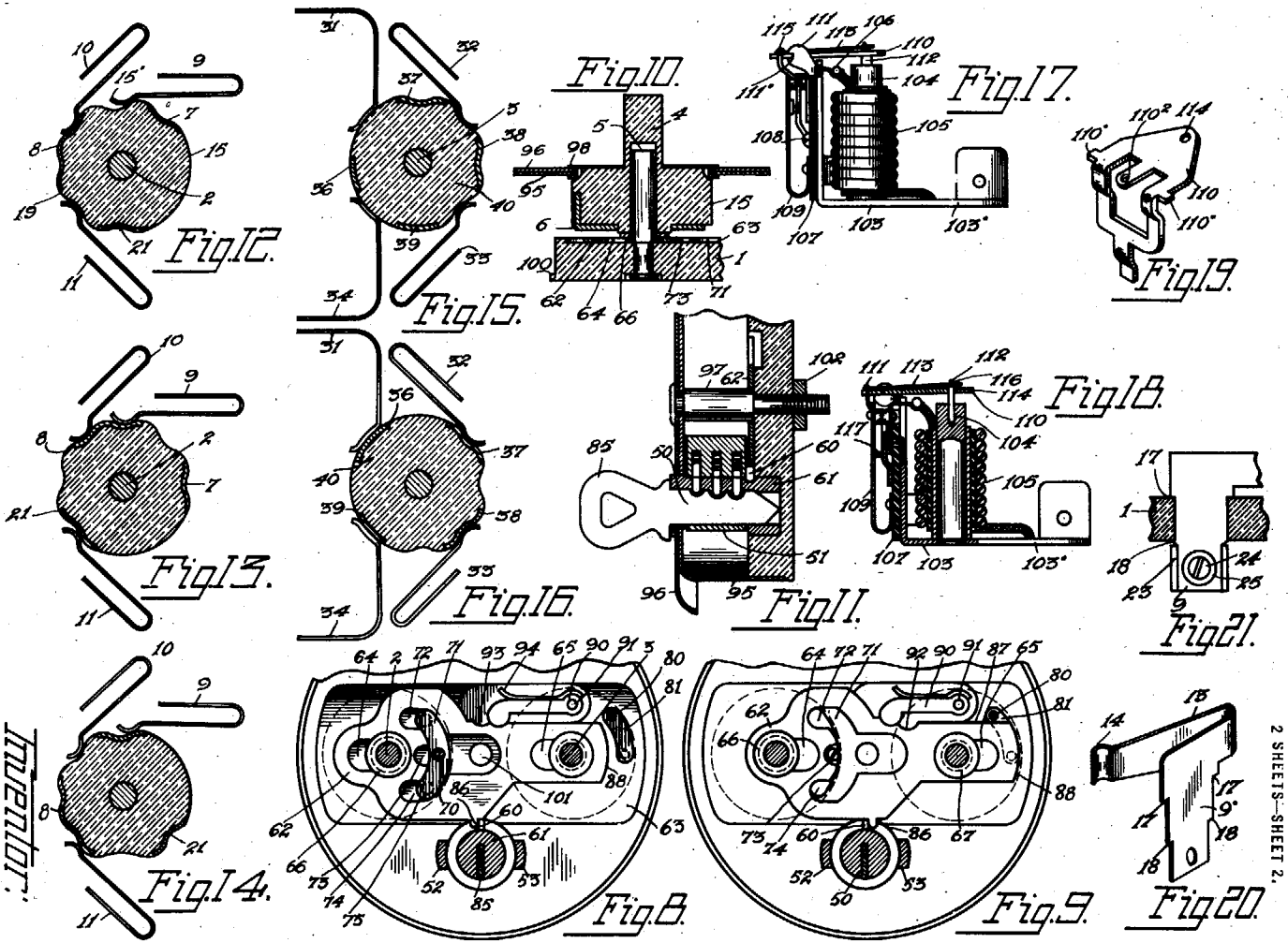
Inventor:
William Kaisling:
By Curtis Camp
Attorney

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

COMBINATION LIGHTING AND IGNITION SWITCH.

15,289. Specification of Reissued Letters Patent. Reissued Feb. 21, 1922.

Original No. 1,399,017, dated December 6, 1921, Serial No. 173,084, filed June 6, 1917. Application for reissue filed December 17, 1921. Serial No. 523,192.

*To all whom it may concern:*

Be it known that I, WILLIAM KAISLING, a citizen of the United States of America, residing in Chicago, county of Cook, and State of Illinois, have invented certain new and useful Improvements in Combination Lighting and Ignition Switches, of which the following is a specification.

My invention relates to electrical switches in general and has to do more particularly with switches for controlling a plurality of circuits, the present embodiment of my invention being constructed more particularly for use in connection with ignition and light circuits for automobiles.

It is an object of my invention to produce an improved device of the class described which embodies desirable features and advantages, all in a simple, efficient and economical manner; and to the accomplishment of this object and such others as may hereinafter appear, the invention consists in novel details of construction, parts and combinations of parts hereinafter described, and particularly pointed out in the appended claims, reference being had to the accompanying drawings forming a part hereof, in which the same reference characters indicate like parts throughout the several views and in which—

Fig. 1 is a face view of the combination switch of my invention;

Fig. 2 is a right side elevation of Fig. 1;

Fig. 3 is a rear view of Fig. 1;

Fig. 4 is an interior face view of the mechanism with the cap removed;

Fig. 5 is a right side elevation of Fig. 4, omitting the mechanism on the back of the mounting plate;

Fig. 6 is a left side elevation of Fig. 4, omitting the mechanism on the back of the mounting plate;

Fig. 7 is a bottom view of Fig. 4 showing one of the springs broken away and omitting the mechanism on the back of the mounting plate;

Fig. 8 is a partial view of the interior mechanism; part of the apparatus being removed to more clearly show the locking arrangement, the switching knobs being at normal and unlocked;

Fig. 9 is similar to Fig. 8, showing the locking mechanism in its operated position;

Fig. 10 is a sectional view through the lighting switch unit to more clearly show the supporting means of the actuating member;

Fig. 11 is a sectional view through the locking mechanism;

Figs. 12, 13 and 14 illustrate the normal and two actuating positions of the lighting switch unit;

Figs. 15 and 16 illustrate the normal and actuated positions of the ignition switch unit;

Fig. 17 is a side view of the overload relay associated with the switch;

Fig. 18 is a sectional view of the relay taken on the line 18—18 of Fig. 3;

Fig. 19 is a perspective view of the armature of the overload relay;

Fig. 20 is a perspective view of one of the contact springs; and

Fig. 21 is a partial sectional view showing the method of securing a spring to the mounting plate.

Referring now in general to my invention as illustrated, it comprises a lighting switch unit L and an ignition switch unit M. The lighting switch unit L has a normal position A and two operative positions B and C, and when the switch is in position B, the head lights, tail light and cowl light are lighted brightly to full candle power, and when in position C the head lights are dimmed, but the tail and cowl lights remain at the same brilliancy as when the lighting switch unit L was in its position B. I do not wish to be limited to this particular arrangement, as many different combinations can be made without departing from the invention.

The ignition switch unit M has a normal position D and an operative position E, and when the ignition switch is moved into position E, the ignition apparatus is rendered operative and the horn circuit is closed, as will be more fully hereinafter described. I also provide locking mechanism which consists preferably of a standard tumbler lock which controls a sliding lock plate which is adapted to lock the lighting and ignition switch units L and M. The locking mechanism is so arranged that it operates only when the switch M is in its normal or inoperative position D, but will operate to lock the switch L in any position. When the ignition switch unit M is in its position D the lock can only be turned part way by the key. Now, if the operator attempts to operate the lock, he is at once aware that the ignition switch is in its operative position and must be moved to its inoperative position D so that the lock can be operated and the key withdrawn.

The locking mechanism of the lighting switch unit L is so constructed that the key may be turned to lock the said lighting switch unit L in any of its positions A, C or B, so that the operator can leave the lights turned off or on and still lock the ignition switch against operation.

Referring now more in detail to my invention as illustrated, it comprises preferably a mounting base or plate 1 made of any suitable insulating material, having studs 2 and 3 fastened to it in any suitable manner, as by staking (as illustrated in Fig. 10). The stud 2 is provided for the lighting switch unit L, and the stud 3 for the ignition switch unit M. The lighting switch unit L comprises a switching knob 4 preferably moulded in the form illustrated in Figs. 4, 5 and 6, and made of any suitable insulating moulding material such as bakelite or the like. The knob 4 is provided with a bearing 5, into which the stud 2 fits (as shown in Fig. 10). The knob 4 is also provided with a button 4′ integrally formed with said knob, the button being adapted to be grasped by the hand of the operator for operating the lighting switch unit L. A conducting plate 6 is provided, preferably set in the said knob during the moulding of the same, the said plate having portions 7, 8 and 21 turned up at right angles to the said plate 6 to form conducting segments which cooperate with the contact springs 9, 10 and 11 associated with the lighting switch unit L. The springs 9, 10 and 11 are all similar in shape and are all secured to the plate 1 in the same manner, so that by describing the method for securing spring 9, a further description of the method of fastening the others will be unnecessary.

The spring 9 (formed as illustrated in Fig. 20) has its free extremity bent substantially parallel with the attached portion of the arm 13, the free end being rounded to form a contact portion 14 for engagement with the knob 4 and its conducting strips 7 and 8. The spring normally rests on the concave portion 15′ of the annular surface 15 of button 4. The tongue 9′ of the spring 9 is forced into a suitable opening 16 in the plate 1, the said opening being slightly smaller than the tongue 9′ so as to produce a forced fit. The spring 9 is provided with shoulders 17 which rest against the top surface of the plate 1 when the spring is in position, and with shoulders 18 which extend slightly beyond the bottom surface of the plate 1. The shoulders 18 are turned over or riveted to hold the said spring in position to prevent it from being withdrawn from the said plate 1. To produce a snap action when the switching knob 4 is moved to its different operative positions, a portion of the annular surface 15 of the knob is corrugated or formed into concave portions, and the conducting segments 7, 8 and 21 are also corrugated and provided with concave portions so that when the switching knob 4 is in the position illustrated in Figs. 4, 5 and 6, the free ends of the springs 9, 10 and 11 rest in these concave portions. Now, when the switching knob 4 is moved from one position to another, the free ends of the springs leave the furrows 20 of the corrugated portions and ride upon ridges 19, and due to the springs being under tension, when the springs leave the apexes of the ridges 19 they tend to turn the knob 4, thus producing a snap action for the said switching knob, at the same time the springs hold the said switching knob 4 in its new position. The springs 9, 10 and 11 have their respective tongues 9′, 10′ and 11′ extend through the plate 1 to form connecting terminals.

A clamping member 23 is provided for each of the springs 10 and 11, and provides means for securing electrical conductors to the said springs. A threaded screw 24 is provided with a split lock washer 25 for securely holding the electrical conductors between the said switch spring tongues 10′ and 11′, and the contact surfaces of the clamping members 23. Tongue 9′ of the spring 9 is connected to one terminal of the winding of the overload relay by means of a screw 24 and lock washer 25.

For purposes that will be more fully hereinafter described, a resistance coil or unit 28 is connected to the terminals of the contact springs 10 and 11, this resistance coil being used in the lighting circuit arrangement to cut down the current flow through the lighting circuit to dim the lights contained therein. When the lighting switch is in normal position A, the lighting circuits are open, as the contact springs 9 and 11 rest upon insulated portions of the annular surface 15 of the knob 4. When the switching knob 4 is moved to position B, the contact springs 9 and 10 engage the segment 8, and spring 11 engages the segment 21, as clearly illustrated in Fig. 13, thus giving one combination of lights. If the switching knob 4 is now moved to position C, the contact spring 9 engages the segment 7, the contact spring 10 engages an insulated portion of the annular surface 15 and the spring 11 engages a portion of the segment 8, thus giving the same combination of lights but cutting in the resistance 28 to dim the headlights, as will be more fully hereinafter described.

Referring now to the ignition switch M, it comprises a switching knob 30 similar in construction to the knob 4 of the lighting switch unit L with the exception of the number of conducting segments and spring combination associated with the said segments. Contact springs 31, 32, 33 and 34 associated with the ignition switch unit M are mounted in plate 1 in a similar manner to that described in connection with the contact springs associated with the lighting switch unit L. The switching knob 30 is also provided with a plate 35 having segments 36, 37, 38 and 39 turned up at right angles to the said plate 35 to form contact surfaces to be engaged by the contacting springs 31, 32, 33 and 34 with which they are operatively associated. The springs 31, 32, 33 and 34 associated with the ignition switch M have their tongue portions 31′, 32′, 33′ and 34′ extending through the bottom of the plate 1 to form terminal members for their respective springs, screws 24, lock washers 25, and clamping members 23 being provided for the said terminals, as previously described in connection with the lighting switch unit L. The contact springs 32 and 33 are formed similarly to those associated with the lighting switch unit L. The contact springs 31 and 34 are L-shaped, the free ends of the said springs 31 and 34 being shaped to conform to the annular surface 40 of the knob 30. A portion of the annular surface 40 is also corrugated or concaved, for purposes already described in connection with the lighting switch unit L.

When the ignition switch M is in its normal position D, there is no circuit connection between the contact springs (as illustrated in Fig. 15). When the switching knob 30 is moved to its position E, the contact springs 31, 32, 33 and 34 engage their respective conducting segments 36, 37, 38 and 39 (as illustrated in Fig. 16) to close operating circuits that will be more fully hereinafter described.

A locking arrangement, whereby the lighting and ignition switch units L and M may be locked against movement, is provided, and includes a well-known tumbler lock 50 which is set into a recess in the plate 1 and operatively associated with a slidable locking plate 62. The barrel 51 is provided with a reduced portion 51′ of a size to just fit into the circular orifice $51^2$ in the cover-cap 95. The barrel 51 of the lock is provided with a pair of downwardly extending lugs 52 and 53 which fit into a suitably recessed opening 54 which is provided with two notches 55 and 56 disposed in the recess 54 to receive the two downwardly extending lugs 52 and 53 of the lock. The notches 55 and 56 are a trifle smaller than the size of the lugs, so that the lugs must be forced into these notches to insure a firm seat for the lock 50. As illustrated in Fig. 11, the lock is provided with a pin 60 which is fastened to the cylinder 61 of the lock 50 in any suitable manner, so that when the key is turned the pin moves with the cylinder.

The locking mechanism includes a sliding lock plate 62 set in a recess 63 of the plate 1. Oblong openings 64 and 65 are provided in the locking plate 62, through which extends the studs 2 and 3. Collars 66 and 67 are provided which slip over said studs 2 and 3 and rest in the openings 64 and 65 of said plate 62 to form guiding means for the plate 62. The collars 66 and 67 also maintain the sliding plate 62 in its position in recess 63. The knobs 4 and 30 keep the collars 66 and 67 in position. These collars cannot be removed until the cover-cap 95 is first removed and then the knobs 4 and 30 removed. I have preferably arranged the ignition switch unit M so that it can only be locked in its inoperative position D, and the lighting switch unit L so that it may be locked in any of its actuated or normal positions, as hereinbefore mentioned. The switching knob 4 of the lighting switch unit L is provided with a pin 70 suitably fastened to it for cooperating with an arcuate opening 71 in the plate 62. Three short slots 72, 73 and 74 are also provided in the plate 62 and extend into the arcuate opening 71. These slots cooperate with the pin 70 of the lighting switch knob 4 to lock the said knob in any of its different positions. An arcuate recess 75 is provided in the plate 1 to limit the movement of the switch knob 4 by the pin 70 engaging the ends of the said recess 75. A pin 80 is also secured to the ignition switching knob 30 and extends downward into an arcuate recess 81 in the plate 1, the said recess limiting the movement of the knob in its normal and actuated positions. The pin 80 also cooperates with the locking plate 62 to lock the ignition switch, as will be more fully described.

In Fig. 8 I have shown the locking mechanism and the switching knobs 4 and 30 of the switch L and M in their normal position, and the locking mechanism in an unactuated position. In Fig. 9 I have shown the locking mechanism operated and the switching knobs 4 and 30 of the switches L and M in their normal positions but locked against movement. To lock the switch, the key 85 is turned until the pin 60 engages the projection 86 of the plate 62. This moves the plate 62 to the right into the position shown in Fig. 9. The pin 70 of the switching knob 4 of lighting switch L is now in the slot 73, thus preventing any movement of the switching knob 4 of the switch L, and the switching knob 30 of the ignition switch unit L cannot be actuated due to the edge 87 of the plate 62 engaging the pin 80.

Assuming now that the ignition switch is in its position E (the pin of the said switching knob 30 being shown in dotted line in Fig. 8), and that the lighting switching knob 4 is in any of its operative positions, if the key is inserted in the lock and an attempt made to operate the said lock, the key can only be turned part way until the edge 88 of the plate 62 comes in contact with the pin 80. The key cannot be withdrawn when it is in this position, and this unsuccessful attempt to turn the key will indicate to the operator that the ignition switch member is in operative position. Then to lock the two switch members L and M, the member M must be moved to its normal or inoperative position D, and when in this position the pin is beyond the edge 88 of the plate 62 and the key can now be turned to lock the switch units L and M. The lighting switch unit L may be locked in either of its actuated positions B or C, provided the ignition switch M is in its inoperative position D, as may readily be seen from inspection of Figs. 8 and 9. To yieldingly hold the plate 62 in its locked or unlocked positions, I provide an arm 90 pivoted to the plate 1 by means of the pivot pin 91. Notches 92 and 93 are provided in the plate 62 in which the arm 90 rests. The arm 90 is spring-pressed in the said notches by means of the spring 94, which is suitably fastened to the plate 1.

A cap 95 is provided to enclose the mechanism and a top or name plate 96 is also provided, the two being held together by means of a stud 97 which is turned over or riveted after passing through suitable openings in plates 95 and 96. Ferrules 98 and 99 are provided and pass through suitable openings in the cap 95 and the plate 96, the ferrules being of a size to permit the passage of the switching knobs 4 and 30. The ferrules are spun over the openings of the cap 95, to hold the plate 96 and the cap 95 in alignment. The ferrules 98 and 99 are of a size to fit into the annular grooves in the knobs 4 and 30 (as shown most clearly in Fig. 10), thereby preventing the said knobs 4 and 30 from being raised off of the pins or studs 2 and 3 until the cover-cap 95 has first been removed. The cap 95 also holds the tumbler barrel 50 in position, as most clearly shown in Figs. 2 and 11. To remove the knobs 4 and 30 and the tumbler barrel 50, it is merely necessary to remove the cover-cap 95, and then the knobs 4 and 30 and the tumbler barrel 50 may be removed from the mounting plate 1. The mounting plate 1 has an annular shoulder 100 upon which the cap 95 rests when in position, and the stud 97 passes through a suitable opening 101 in the plate 1. The said stud 97 is provided with a threaded end portion to receive a nut 102, which holds the cap securely upon the plate 1. The cap 95 and the plate 96 are also provided with suitable openings for the lock 50.

Associated with the switching device is an overload relay OL which comprises a heel iron 103 to which the core 104 of the relay is suitably fastened. A suitable winding 105 is provided for the said relay and has one of its terminals secured to the terminal 9′ and its other terminal connected to the contact piece 106, which contact piece is suitably mounted upon an insulation plate 107, which plate is in turn mounted upon the heel iron 103 by means of screws 108. A contact spring 109 is in normal engagement with the contact 106, the said spring being suitably fastened to the plate 107, the terminal of the said spring 109 being connected to the terminal 32′. An armature 110 is provided for the relay, and is supported by the heel iron 103. The heel iron 103 is provided with upturned ears 111, the said ears being slotted at 111′ to receive the extensions 110′ of the armature 110. The armature 110 is pivotally supported by the said slots 111′, and is held in place by means of a pin 112 and a spring 113. The said pin 112 fits into a suitable opening in the core of the magnet and extends through an opening 114 in the armature 110. The tension spring 113 has one end fastened to the tongue projection $110^2$ of the armature 110 by means of the rivet 115. The free end of the said spring 113 is provided with a suitable opening 116 which is of a size to fit over the reduced portion of the pin 112. This spring 113 pivotally secures the armature 110 in the ears 111 of the heel iron 103. The spring also holds the armature in its normal position under spring tension and also prevents the pin 112 from displacement in the core 104. An insulating button 117 is suitably secured to spring 109 and is adapted to be engaged by the armature 110 to open the normally closed contacts 109 and 106, upon the energization of the said relay. The relay OL is held in place by means of the extension 103′ of the heel iron 103, which extension is secured to the terminal 9′ by means of a screw 24. The spring 109 is provided with an extension 109′ which is secured to the terminal 32′ by means of a screw 24.

To remove the armature from the relay, it is only necessary to raise the spring 113, turn it to either side and remove the pin 112 from the core of the magnet, and then the armature may be removed by sliding the armature ears 110 and 110′ out of their bearings in the heel iron of the relay.

While the invention has been described with particular reference to the details of construction, it should be understood that it is not limited thereto, as many changes and modifications may be made therein without departing therefrom, and I, therefore, wish to cover all such changes and modifications which come within the spirit and scope of the appended claims.

What I claim as new and desire to secure by United States Letters Patent, is:

1. A switch device including a light switch and an ignition switch, a mounting plate provided with a pair of firmly secured studs, a movable contact maker for said light switch supported by one of said studs, a movable contact member for said ignition switch supported by the other of said studs, a slidable lock plate for locking said switches, slots for said lock plate through which said studs project, collars adapted to fit over said studs into the slots of said lock plate, said collars forming guides for said plate and bearings for said rotatable contact makers, and a cover-cap for preventing displacemnt of said contact makers.

2. A switch device of the character described including a mounting plate, a pair of pins secured to said mounting plate, rotatable contact makers supported by said pins, locking mechanism for securing said rotatable contact makers against movement, a lock controlling member for actuating said lock mechanism, a recess in said mounting plate into which said lock controlling member sits, and a cover-cap for said device for holding said rotatable contact makers and said lock controlling member in position.

3. A device of the character described including a mounting plate, a pair of pins supported by said mounting plate, a rotatable contact maker supported by each of said pins, a slidable lock plate provided with slots through which said pins project, collars for said pins which fit into the slots of said locking plate, forming guiding means therefor, and against which said rotatable contact makers rest, and a pin for each of said rotatable members adapted to cooperate with said lock plate to prevent actuation of said contact makers.

4. A device of the character described including a mounting member, an upwardly extending pin secured to said mounting member, a contact maker supported by said pin, a lock element mounted between said contact maker and said mounting plate, a slot cut in said lock element through which said pin projects, a collar adapted to fit over said pin into said slot, said collar supporting said contact maker and forming guiding means for said lock element, and a cover-cap for preventing displacement of said contact makers.

5. A device of the character described including a mounting plate, a rotatable contact maker supported by said mounting plate provided with an annular peripheral surface, said annular surface being provided with depressions, contact springs suitably supported by said mounting plate provided with rounded end portions adapted to fit into said depressions to hold said contact maker in position, a locking device for preventing actuation of said contact maker, and a cover-cap adapted to fit onto said mounting plate provided with an orifice through which part of said contact maker protrudes, the inner peripheral surface of said orifice fitting into an annular groove in said contact maker to prevent longitudinal movement of said contact maker.

6. A device of the character described including a mounting plate, an upwardly extending pin secured to said plate, a contact maker rotatably supported by said pin, said contact maker being provided with an annular peripheral surface having depressions, contact springs provided with end portions adapted to conform to said depressions, whereby said springs operate to give a snap movement to said contact maker when operated, a locking device for preventing actuation of said contact maker, a cover member adapted to fit onto said mounting plate, an orifice in said cover through which a portion of said contact maker protrudes, and an annular groove formed in said contact maker, said annular groove adapted to fit into said orifice whereby said cover prevents longitudinal movement of said contact maker.

7. A device of the character described including a mounting plate, a rotatable contact maker supported by said mounting plate provided with an annular peripheral outer surface, a portion of said surface being of conducting material and a portion of insulating material, depressions in said surface, contact springs provided with rounded end portions adapted to normally rest in the depressions of insulating material, and adapted to rest in the depressions of conducting material when said contact maker is in operative position, a locking device for preventing actuation of said contact maker, a cover member adapted to fit onto said mounting plate, an orifice in said cover through which a portion of said contact maker protrudes, and an annular groove formed in said contact maker, said annular groove adapted to fit into said orifice whereby said cover prevents longitudinal movement of said contact maker.

8. A device of the character described, including a mounting member, a contact maker rotatably supported by a pin secured to said mounting member, an annular peripheral surface for said contact maker, a portion of said surface being formed of conducting material and a portion of said surface being formed of insulating material, depressions in said surface, contact springs provided with rounded end portions adapted to fit into said depressions to yieldingly hold said contact maker in position, a locking plate for preventing actuation of said contact maker, a cylindrical cup-shaped cover adapted to fit onto said mounting member, an orifice formed in said cover through which the actuating member of said contact maker protrudes, and an annular groove formed in said contact maker, the orifices in said cover adapted to fit into said annular groove to prevent longitudinal movement of said contact maker.

9. A device of the character described including a mounting plate provided with a recess, a switching member supported by said mounting plate, a lock controlling device for preventing actuation of said switching member and adapted to sit in said recess, and a cover-cap for said device adapted to hold said lock controlling device in said recess.

10. A device of the character described including a mounting plate, a pair of rotatable switch members supported by said mounting plate, a lock controlling member supported by said mounting plate and a cover cap adapted to fit onto said mounting plate and provided with orifices through which said contact operating members and said lock controlling member project, but which holds said members in position.

11. A device of the character described including a mounting plate provided with a projecting pin, a movable contact maker provided with a cylindrical recess adapted to receive said pin to rotatably support said contact maker, an annular groove cut in said contact maker, a cover cap adapted to fit onto said mounting plate provided with an annular orifice, the periphery of said orifice being adapted to fit into said annular groove to secure said contact maker in position.

12. A device of the character described including a mounting plate, a rotatable contact maker supported by said mounting plate, a pin secured to said contact maker, an arcuate slot cut in said mounting plate adapted to receive said pin to limit the movement of said contact maker, a slidable lock plate mounted between said contact maker and said mounting plate, and a slot cut in said lock plate adapted to cooperate with said pin to lock said contact maker against movement.

13. A device of the character described including a mounting plate, a contact maker supported by said plate, a downwardly projecting pin carried by said contact maker, an arcuate slot cut in said plate adapted to receive said pin to limit the movement of said contact maker, and a lock member adapted to cooperate with said pin to secure said contact maker against movement.

14. A switch device including a light switch and an ignition switch, a mounting plate provided with a pair of firmly secured studs, a movable contact maker for said light switch supported by one of said studs, a movable contact member for said ignition switch supported by the other of said studs, a slidable lock plate provided with slots through which said studs project, collars adapted to fit over said studs into the slots of said lock plate, said collars forming guides for said plate and bearings for said rotatable contact makers, and a cover cap for maintaining said contact makers in position.

15. A device of the character described including a mounting plate, a pair of supporting studs secured to said plate, a rotatable contact maker supported by each of said supporting studs, a pin secured to each of said contact makers, an arcuate slot cut in said mounting plate and cooperating with the pin of one of said contact makers to limit the movement thereof, a slidable lock plate mounted between said contact makers and said mounting plate, an arcuate slot cut in said lock plate to limit the movement of the other of said contact makers, and slots cut in said lock plate adapted to cooperate with said pins to lock said contact makers against actuation.

16. A device of the character described having a spring, an element having an arcuate bearing surface for said spring, said surface provided with a number of indentations for said spring to engage in order to anchor the switch mechanism in various adjusted positions; an ignition circuit through said switch including said spring and a conducting element in one of said indentations; a handle for operation to cause a reciprocating rotary adjustment between said spring and said element; a switch base and a pin, said pin supporting said handle for rotation; a lock for said switch supported by said base; a cover for said device arranged for attachment to said base, said cover when attached thereto maintaining said handle, said spring and said element and said lock in adjusted positions respectively.

17. A device of the character described including a pair of switches each including a spring, indentations for said springs to engage to hold the switch mechanism in various adjusted positions, some of said indentations containing metallic contact terminals for said springs to engage, a common switch base, a pair of manually operated actuating members for said switches, respectively, to change the relations between said springs and indentations, said members supported on pins and said pins supported on said base, a lock supported on said base and a member of said device in operative relation with said lock to be locked thereby, a cover for said device fastened to said base and holding said members, said pins, said lock and said base in their properly adjusted relation.

18. An electric switch comprising a spring member, a bearing surface for said spring to ride over, said surface having recessed portions for engagement by said spring to hold the mechanism in "on" and "off" positions, respectively, a circuit conductor having a terminal and a recessed portion of said surface engaged by said spring when the switch is in "on" position, manually operated means for changing the adjustment between said springs and surface to place the switch in "on" or "off" positions, a base member, a cover-cap for said switch, means for fastening said cover-cap and base together, and cooperating means for said manually operated means and said cover-cap whereby when said cover-cap is secured to said base, said manually operating means is secured in position, thereby holding said bearing surface and said spring in adjusted engaging position.

19. A device of the character described including a mounting plate, a contact maker, a pin engaging a recess in said mounting plate for pivotally supporting said contact maker upon said mounting plate, contact springs and depressions disposed in registrational arrangement for holding said contact maker in position, a locking device for preventing actuation of said contact maker, and a cover-cap adapted to fit onto said mounting plate and provided with an orifice through which part of said contact maker protrudes, the inner peripheral surface of said orifice fitting into an annular groove in said contact maker to prevent the longitudinal movement of said contact maker.

20. A device of the character described including a mounting plate, a contact maker, a pin for pivotally supporting said contact maker upon said mounting plate, contact springs and depressions disposed in a manner to make registration with each other to retain said contact maker in position, a locking means for preventing the actuation of said contact maker, and a cover cap provided with orifices for permitting the partial protrusion of said contact maker and a part of said locking means thereby preventing the endwise movement of said contact member and locking means.

21. A device of the character described including a mounting plate, a rotatable contact maker pivotally supported upon said mounting plate by a pin engaging a recess in said mounting plate, contact springs disposed in a registrational manner with a plurality of depressions so that said contact springs engage different groups of said depressions when said contact maker is rotated, locking means for preventing the rotation of said contact maker, and a cover cap adapted to fit onto said mounting plate and to prevent the longitudinal movement of said contact maker and said locking means.

22. A device of the character described including a mounting plate, a rotatable contact maker pivotally supported upon said mounting plate by a pin engaging a recess in said mounting plate and adapted to be set in different positions, contact springs operatively associated with depressions greater in number than said contact springs and disposed in a manner so that said springs register with certain groups of said depressions when said contact member is set in its different positions, the registration of said springs and depressions controlled by said contact maker, and a cover-cap adapted to fit onto said mounting plate provided with an orifice through which part of said contact maker protrudes, the inner peripheral surface of said orifice fitting into an annular groove in said contact maker to prevent longitudinal movement of said contact maker.

23. A device of the character described including a mounting plate, a rotatable contact maker suitably supported by said mounting plate, and adapted to rest in various positions, contact springs provided with rounded end portions and disposed in a registrational manner with a plurality of depressions so that said rounded end portions engage said depressions when said contact maker is at rest and to leave the then engaged depressions and engage other depressions when said contact maker is rotated to another position, the springs and cooperating depressions cooperating to retain said contact maker in its various positions, a locking member for preventing the rotation of said contact maker, and a cover-cap adapted to fit onto said mounting plate provided with an orifice to permit the protrusion of a part of said contact maker to prevent its longitudinal movement but to allow its rotary movement.

24. A device of the character described including a mounting plate, a supporting pin engaging a recess in said plate, a rotatable contact maker pivotally supported by said pin and adapted to be moved to a plurality of positions, contact springs having rounded end portions in registration with suitable depressions for holding said contact maker in position, a locking element for preventing the rotation of said contact maker, and a cover-cap for said device adapted to permit access to said contact maker but to prevent its longitudinal movement and to prevent longitudinal movement of said locking element.

25. A device of the character described including a mounting plate, a rotatable contact maker pivotally supported by a pin engaging a recess in said plate, contact springs provided with rounded end portions adapted and disposed in a manner to permit their registration with metallic contact depressions and non-contact depressions to yieldingly hold said contact maker in position, and a cylindrical shaped cover-cap adapted to fit into said mounting member, an orifice in said cover cap through which the actuating member of said contact maker protrudes, and an annular groove formed in said contact maker, the orifice in said cover adapted to fit into said annular groove to prevent longitudinal movement of said contact maker.

26. A device of the character described including a mounting plate, a switching member adapted to be set in different positions pivotally supported upon said plate, contact springs, a plurality of depressions disposed and adapted to register with said contact springs when said switching member is set in any of its different positions, and to yieldingly hold said switching member in position, locking means for preventing the actuation of said switching member, a lock barrel to control said locking means, and a cover-cap for said device and adapted to prevent the displacement of said switching member but to allow its being set in its different positions and to prevent displacement of said lock barrel.

27. A device of the character described including a mounting plate, a rotatable switching member pivotally supported by a pin engaging a recess in said plate and adapted to be set in different positions, contact springs having rounded end portions, registering depressions greater in number than said contact springs and so disposed as to permit their registration with said contact springs when said switching member is rotated to its different positions, said springs and depressions adapted to hold said switching member in position, locking means for preventing the rotation of said switching member, a lock barrel and a key plug therein for controlling said locking means, projections on said barrel to prevent rotation thereof, and a cover-cap for said device and adapted to permit access to the handle of said switching member and to prevent the longitudinal movement of said switching member and of said lock barrel and key plug.

28. A device of the character described including a mounting plate, a switching member pivotally supported by a pin upon said plate, and adapted to be rotated and rest in differential positions, contact springs having rounded end portions disposed in operative relation with a plurality of depressions so that when said switching member is rotated to any of its positions, said rounded end portions are caused to register with certain depressions of said plurality of depressions to hold said switching member in position, a locking device for said switching member to prevents its rotation, a lock barrel and a key plug therein for controlling said locking means, projections on said barrel to prevent rotation thereof, and a cover cap adapted to be fitted onto said plate provided with an orifice for permitting the protrusion of a part of said switching member to prevent the endwise movement thereof and with a second orifice through which said key plug extends to prevent endwise movement of said key barrel.

29. A device of the character described including a mounting plate, a switching member supported by said plate and adapted to be rotated and rest in different positions, a contact spring arranged and disposed to make registration with a plurality of depressions when said contact spring is at rest to hold said switching member in position and adapted to disengage the then engaged depressions and to engage other depressions when said member is rotated to another position, a locking device for said switching member to prevent its rotation, a key barrel for controlling said locking device, a plug protruding from the ends of said key barrel, an orifice in said plate to receive one end of said key plug, a member projecting from said key barrel to prevent the same from rotating, a cover-cap adapted to fit onto said plate provided with an orifice through which a part of said switching member protrudes, a second orifice for said cover-cap through which the other end of said lock plug protrudes, and an annular groove formed in said switching member, the orifice in said cover adapted to fit into said annular groove to prevent longitudinal movement of said contact maker.

30. An electrical switching device comprising a pair of switches having each a rotarily adjustable switch handle, a common back plate for said switches carrying the stationary contacts of the switches and rotatably supporting said adjustable switch handles, a lock and a slidable locking plate therefor for actuation to lock one of said switches, said lock plate supported between said back plate and said handles, collars one for each of said handles, and a pair of slots in said locking plate, one for each of said collars adapted to engage said collars to guide the sliding of said locking plate.

31. An electrical device comprising a pair of switches, each having an adjustable switch handle and active switch parts adjustable thereby, front and back elements common to said switches adapted for adjustment to clamp the active parts in assembly positions, one of said elements supporting stationary contacts for engagement by the active parts, a lock and a slidable locking plate controlled thereby for locking one of said switches, a pair of hubs for said adjustable switch handles and held in position thereby and adapted to be engaged by a slot in said plate to guide the sliding of said plate.

32. A device of the character described having a supporting element and a pair of switch devices manually adjustable to different positions with respect to said element, contacts having fixed positions with respect to said element for engagement by said switch devices, a lock supported by said element, one of said devices adapted to be locked thereby, and a common clamping element for holding said lock and said devices in correct assembly positions with respect to said supporting element.

33. A device of the character described having a supporting element, a pair of devices manually adjustable to different positions with respect to said element, said element serving to support said devices in rotatable relation with respect to itself, spring means for holding the devices in switching position, a common clamping element for holding the devices correctly assembled with respect to the base, and a lock for preventing operation of one of said devices and clamped in position with respect to said supporting element by said clamping element.

34. A device of the character described including a mounting plate provided with a bearing, a switching member supported by said plate in operating relation with the bearing, a lock controlling device for preventing actuation of said switching member and adapted to be supported on said plate, and a member common to said switching member and said lock controlling device for attachment to said plate to hold them in their assembly positions.

35. A device of the character described including a mounting plate and a switching member supported on said plate, a lock controlling device for preventing actuation of said switching member, said plate having a part for said lock controlling device to fit into, and a covering element for said device adapted to hold said lock controlling device fitted into said part.

36. A device of the character described including a mounting plate and a switching member supported on said plate, a lock controlling device for preventing actuation of said switching member, said plate having an element for said lock controlling device to fit into and a cover element for said device adapted to hold said lock controlling device in its longitudinally and rotarily adjusted assembly position as fitted into said element.

37. A device of the character described including a mounting plate provided with a recess, a switching member supported by said mounting plate, a lock controlling device for preventing actuation of said switching member and adapted to set in said recess, and a clamping element for said device adapted to hold said lock controlling device in said recess.

38. A device of the character described including a mounting plate, a switching member rotatably supported by said mounting plate, contacts supported by said mounting plate, spring means cooperating with said switching member to hold it in its adjusted position, a lock for preventing actuation of said switching member, and a clamping element for said device for holding said switching member in position against longitudinal movement.

39. A device of the character described including a back plate, a contact maker supported by said plate, means carried by said contact maker for cooperation with said back plate to limit the movement of said contact maker, a groove for said contact maker, a front clamping plate provided with an orifice, and means for securing said back plate to said front plate in position so that said orifice in said clamping plate fits in said groove of said contact maker to hold the same in position.

40. A device of the character described including a back plate, a contact maker rotatably supported by said back plate, a lock controlling device for preventing actuation of said contact maker, and a front clamping plate adapted to be secured to said back plate to hold said lock controlling device and said contact maker in position.

Signed by me at Chicago, in the county of Cook and State of Illinois, this 14th day of December, 1921.

WILLIAM KAISLING.